US005923518A

United States Patent [19]

Hensley

[11] Patent Number: 5,923,518

[45] Date of Patent: Jul. 13, 1999

[54] SURGE ARRESTER HAVING DISCONNECTOR HOUSED BY END CAP

[75] Inventor: Steven P. Hensley, Geneva, Ill.

[73] Assignee: Joslyn Manufacturing Co., Chicago, Ill.

[21] Appl. No.: 08/954,987

[22] Filed: Oct. 21, 1997

Related U.S. Application Data

[63] Continuation-in-part of application No. 08/907,327, Aug. 6, 1997, abandoned.

[51] Int. Cl.[6] .......... H02H 1/00

[52] U.S. Cl. .......... 361/117; 361/131

[58] Field of Search .......... 361/117, 118, 361/120, 126, 127, 131; 337/30, 31, 33, 34, 35

[56] References Cited

U.S. PATENT DOCUMENTS

| | | | |
|---|---|---|---|
| 3,702,419 | 11/1972 | Carothers et al. | 361/117 |
| 4,404,614 | 9/1983 | Koch et al. | 361/128 |
| 4,609,902 | 9/1986 | Lenk | 337/30 |
| 4,663,692 | 5/1987 | Carothers et al. | 361/117 |
| 4,734,823 | 3/1988 | Cunningham | 361/125 |
| 4,851,955 | 7/1989 | Doone et al. | 361/117 |
| 5,113,167 | 5/1992 | Raudabaugh | 361/125 |
| 5,296,998 | 3/1994 | Jergenson et al. | 361/117 |
| 5,625,523 | 4/1997 | Nedriga | 361/127 |
| 5,721,664 | 2/1998 | Uken et al. | 361/125 |

FOREIGN PATENT DOCUMENTS

| | | | |
|---|---|---|---|
| 0 655 814 | 5/1995 | European Pat. Off. | H01T 1/14 |

OTHER PUBLICATIONS

International Search Report, dated Apr. 9, 1998, Application No. PCT/US98/11099.

*Primary Examiner*—Ronald W. Leja
*Attorney, Agent, or Firm*—Marshall, O'Toole, Gerstein, Murray & Borun

[57] ABSTRACT

An apparatus includes a surge arresting element, first and second end caps, an arrester housing, and a fault disconnector. The surge arresting element is arranged to conduct in the presence of a surge on a power line. The first and second end caps are arranged to be electrically connected to the surge arresting element, and the second end cap forms a disconnector housing. The arrester housing is arranged to house the surge arresting element and the first and second end caps so that the disconnector housing is accessible from an exterior of the arrester housing. The fault disconnector is arranged to electrically disconnect the surge arresting element from the power line in the event of a fault, and the fault disconnector is housed within the disconnector housing formed by the second end cap. A fastener is arranged to fasten the surge arresting element, the first and second end caps, the arrester housing, and the fault disconnector to a mounting bracket so as to wedge the arrester housing between the mounting bracket and the second end cap in order to form a seal.

58 Claims, 4 Drawing Sheets

SURGE ARRESTER HAVING DISCONNECTOR HOUSED BY END CAP

RELATED APPLICATION

This application is a continuation-in-part of U.S. application Ser. No. 08/907,327 filed on Aug. 6, 1997, now abandoned.

TECHNICAL FIELD OF THE INVENTION

The present invention relates to a surge arrester for shunting electrical surges to ground. More particularly, the surge arrester of the present invention may have a disconnect which disconnects the surge arrester from ground in the event of a failure of the surge arrester.

BACKGROUND OF THE INVENTION

Overvoltage surges, which travel along an electric power distribution system and which are not properly averted or diverted, often damage transformers and other electrical equipment of the electric power distribution system, as well as the electrical equipment of residential, commercial and industrial customers supplied by the electric power distribution system. Consequently, surge arresters are commonly used in an electric power distribution system for shunting overvoltage surges to system ground before the overvoltage surges can damage the electrical equipment connected in, or to, the electric power distribution system.

Typical surge arresters used in electric power distribution systems can fail in a runaway condition. When such a failure occurs, the surge arrester may explode apart, potentially damaging nearby equipment and injuring anyone who happens to be near. Therefore, it has been a common prior art practice to provide surge arresters with fault disconnectors which open the circuits containing failed surge arresters. Usually, a fault disconnector is connected between its corresponding surge arrester and ground so that, when the fault disconnector activates upon failure of the surge arrester, the fault disconnector separates the surge arrester from its ground connection. The separated ground connection not only disconnects the failed surge arrester from the electric power distribution system, but also provides a visible indication to a utility linesmen that the surge arrester has failed.

A typical fault disconnector includes a cartridge, which may contain a predetermined amount of gun powder, and which is heated as the surge arrester begins to fail. When the cartridge heats sufficiently, it explodes separating the surge arrester from its ground connection. The amount of gun powder that is used in the cartridge is sufficient to cause such separation but not sufficient to cause damage or injury.

The cartridge, and the other elements of the fault disconnector, are contained within a disconnector housing that is a separate component of the surge arrester, that has an internally threaded hole for threaded attachment to a housing of the surge arrester, and that has an external threaded ground connector for attachment to a ground lead. An electrical resister, which is another element of the fault disconnector and which is housed by the disconnector housing, is electrically connected between a surge arrester terminal and the ground connector of the disconnector. Accordingly, when the surge arrester fails, the current through the electrical resister increases abnormally and generates enough heat to trigger the cartridge causing it to break the disconnector housing and to separate the ground terminal from the surge arrester.

The use of a separate disconnector housing increases the part count of a surge arrester which, in turn, increases the manufacturing cost of the surge arrester. The present invention is directed to a surge arrester which reduces part count.

SUMMARY OF THE INVENTION

In accordance with one aspect of the present invention, a surge arrester comprises a surge arresting element, first and second end caps, and a fault disconnector. The surge arresting element is arranged to conduct in the presence of a surge. The first end cap is arranged to electrically connect the surge arresting element to a first electrical line. The second end cap is electrically connected to the surge arresting element and forms a disconnector housing. The fault disconnector is arranged to electrically connect the second end cap to a second electrical line, the fault disconnector is arranged to disconnect the surge arresting element from the second electrical line in the event of a fault, and the fault disconnector is housed within the disconnector housing formed by the second end cap.

In accordance with another aspect of the present invention, an apparatus for arresting a surge on a power line comprises a surge arresting element, first and second end caps, an arrester housing, and a fault disconnector. The surge arresting element is arranged to conduct in the presence of the surge on the power line. The first end cap is arranged to electrically connect the surge arresting element to a first electrical line. The second end cap is electrically connected to the surge arresting element, and the second end cap forms a disconnector housing. The arrester housing is arranged to house the surge arresting element and the first and second end caps. The fault disconnector is arranged to connect the second end cap to a second electrical line, the fault disconnector is arranged to disconnect the surge arresting element from the second electrical line in the event of a fault, and the fault disconnector is housed within the disconnector housing formed by the second end cap.

In accordance with yet another aspect of the present invention, a surge arrester comprises arrester elements, an arrester housing, a mounting bracket, and a fastener. The arrester elements are arranged to conduct in the event of a surge. The arrester housing houses the arrester elements. The mounting bracket supports the arrester elements and the arrester housing. The fastener clamps the arrester elements and the arrester housing to the mounting bracket so that the arrester housing is wedged between the mounting bracket and the arrester elements in order to form a seal for the arrester elements.

In accordance with a further aspect of the present invention, a surge arrester comprises a plurality of surge arresting elements, an arrester housing, and a fault disconnector. A first of the surge arresting elements is arranged to be electrically connected to a first electrical line, a second of the surge arresting elements is arranged to conduct in the presence of a surge, and a third of the surge arresting elements forms a disconnector housing. The arrester housing is arranged to house the plurality of surge arresting elements so that the disconnector housing is accessible from an exterior of the arrester housing. The fault disconnector is arranged to electrically connect the third of the surge arresting elements to a second electrical line, the fault disconnector is arranged to disconnect the surge arresting elements from the second electrical line in the event of a fault, and the fault disconnector is housed within the disconnector housing.

In accordance with a still further aspect of the present invention, a surge arrester comprises arrester elements, an arrester housing, a mounting bracket, and a threadless fastener. The arrester elements are arranged to conduct in the event of a surge. The arrester housing houses the arrester elements. The mounting bracket supports the arrester elements and the arrester housing. The threadless fastener is arranged to attach the arrester elements and the arrester housing to the mounting bracket so that the arrester elements and the arrester housing are supported by the mounting bracket.

In accordance with a yet further aspect of the present invention, a surge arrester comprises arrester elements, an arrester housing, and an electrically conductive connector. The arrester elements are arranged to conduct in the event of a surge. The arrester housing houses the arrester elements, and the arrester housing has an integrally formed O-ring. The electrically conductive connector cooperates with the integrally formed O-ring to form a seal between an interior of the arrester housing and an exterior of the arrester housing, and the electrically conductive connector is arranged to be electrically coupled to one of the arrester elements.

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 1:
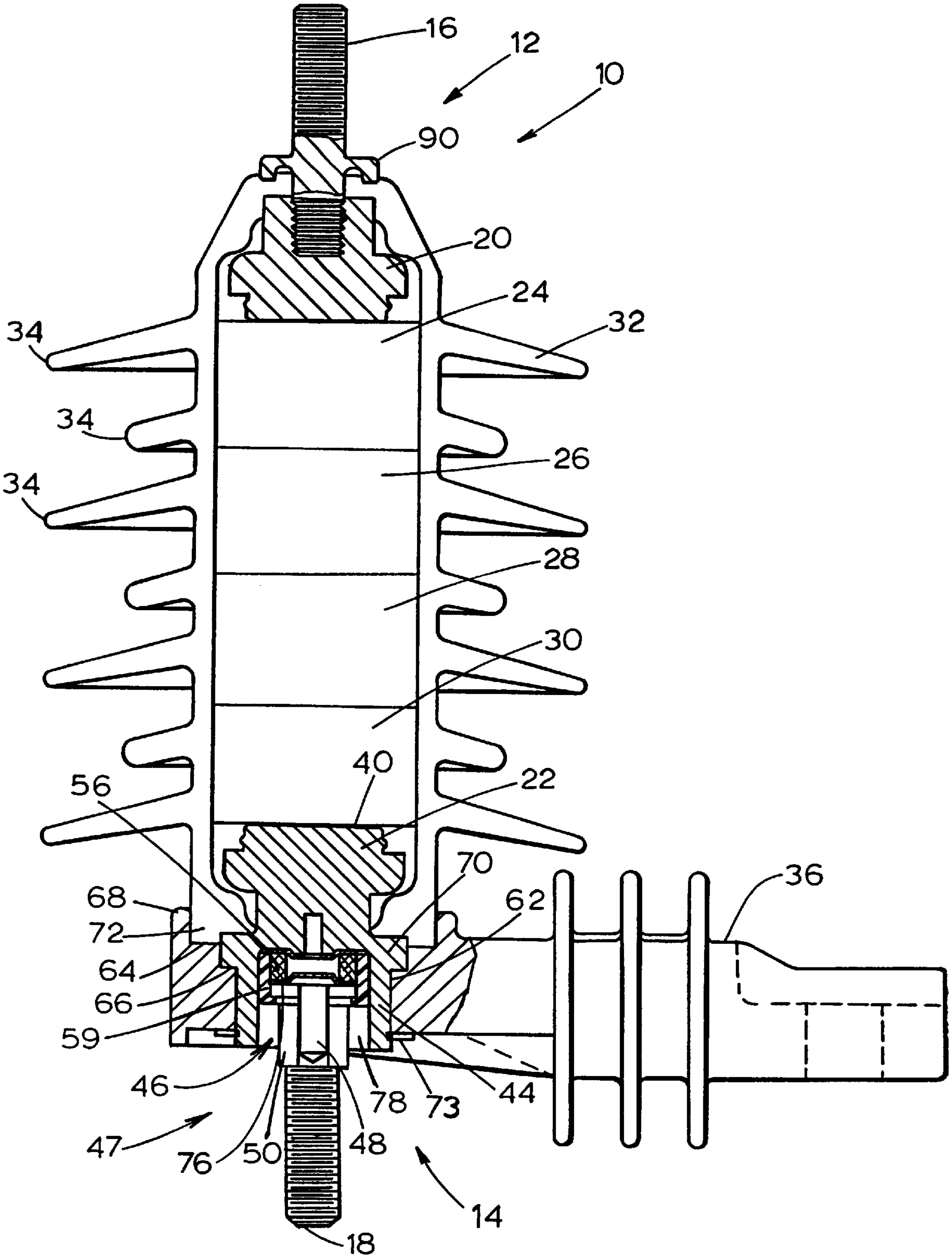
FIG. 1 illustrates a first embodiment of a surge arrester that includes a fault disconnector according to the present invention.

As shown in FIG. 1, a surge arrester 10 includes a first terminal end 12 and a second terminal end 14. The first terminal end 12 includes a first connector 16 which is used to electrically connect the surge arrester 10 to a first electrical line. The second terminal end 14 includes a second connector 18 which is used to electrically connect the surge arrester 10 to a second electrical line. The first electrical line may be, for example, an electrically conducting lead which connects the first connector 16 to a high voltage line of an electrical power distribution system, and the second electrical line may be an electrically conducting lead which connects the second connector 18 to ground. Alternatively, however, the first electrical line may be, for example, an electrically conducting lead which connects the first connector 16 to ground, and the second electrical line may be an electrically conducting lead which connects the second connector 18 to a high voltage line of an electrical power distribution system.

The first connector 16 is threaded into a first end cap 20, and the second connector 18 is electrically connected to a second end cap 22 in a manner to be described below. The first and second end caps 20 and 22 are electrically conductive and, for example, may be formed from aluminum. A first surge arresting element 24 is in electrical contact with the first end cap 20, a second surge arresting element 26 is in electrical contact with the first surge arresting element 24, a third surge arresting element 28 is in electrical contact with the second surge arresting element 26, and a fourth surge arresting element 30 is in electrical contact with both the third surge arresting element 28 and the second end cap 22. Accordingly, a series circuit is formed between the first and second end caps 20 and 22. The surge arresting elements 24–30 may be metal oxide varistor blocks, for example, which conduct in the presence of surges in order to shunt the surge energy in the electric power distribution system between the first and second connectors 16 and 18.

An arrester housing 32 houses the first and second end caps 20 and 22 and the surge arresting elements 24, 26, 28, and 30. As is known, the arrester housing 32 may be an insulating polymeric or porcelain housing having a plurality of polymeric or porcelain water sheds 34. A mounting bracket 36 is provided in order to mount and support the surge arrester 10 to a utility pole or other apparatus of an electric power distribution system.

Figure 2:
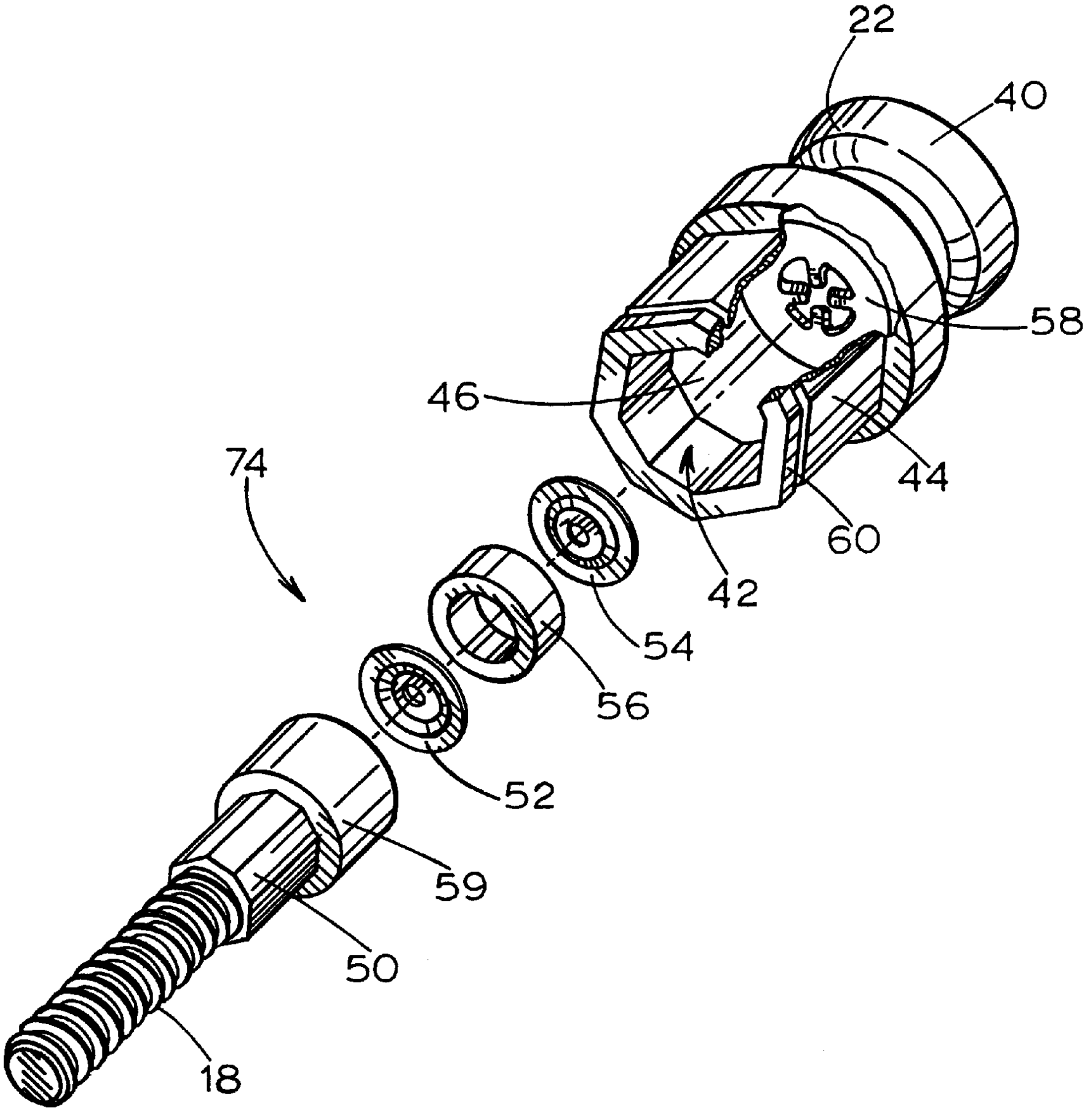
FIG. 2 is an exploded view of the fault disconnector illustrated in FIG. 1.

As shown in FIGS. 1 and 2, the second end cap 22 has a first end 40 which is in electrical contact with the fourth surge arresting element 30. The second end cap 22 also has a second end 42 which comprises a wall 44 forming a recess 46. A fault disconnector 47 includes a cartridge 48 which is contained within an end 50 of the second connector 18. The fault disconnector 47 also includes a first electrically conductive washer 52 abutting the end 50 of the second connector 18, a second electrically conductive washer 54 abutting an internal wall 58 of the second end cap 22, and a resister 56 sandwiched between the first and second electrically conductive washers 52 and 54. A plastic cup 59 contains the first and second electrically conductive washers 52 and 54 and the resister 56 when the fault disconnector 47 is assembled as shown in FIG. 1. Thus, the plastic cup 59 insulates the resister 56 and the first and second electrically conductive washers 52 and 54 from the wall 44 of the second end cap 22 forcing fault current to flow from the second end cap 22 through the second electrically conductive washer 54, through the resistor 56, through the first electrically conductive washer 52, and through the second connector 18.

The wall 44 of the second end cap 22 has a circumferential groove 60 therearound. During assembly of the surge arrester 10, the surge arresting elements 24, 26, 28, and 30 are stacked between the first and second end caps 20 and 22. The stack formed by the surge arresting elements 24, 26, 28, and 30 and the first and second end caps 20 and 22 is wrapped with a fiber glass weave in order to retain the surge arresting elements 24, 26, 28, and 30 and the first and second end caps 20 and 22 in the stack. The arrester housing 32 is applied to the wrapped stack of the surge arresting elements 24, 26, 28, and 30 and the first and second end caps 20 and 22 as shown in FIG. 1. For example, the arrester housing 32 may be molded directly on the wrapped stack of the surge arresting elements 24, 26, 28, and 30 and the first and second end caps 20 and 22.

The arrester housing 32 is mounted to the mounting bracket 36 by inserting the wall 44 through an opening 62 in the mounting bracket 36 as shown in FIG. 1. The mounting bracket 36 may have a first recess 64 and a second recess 66 which are concentric with respect to one another. The first recess 64 is formed by a generally cylindrical wall 68 of the mounting bracket 36. The generally cylindrical wall 68 may have an internal taper. As the second end cap 22 is pushed through the opening 62 in the mounting bracket 36, a flange 70 of the second end cap 22 enters the second recess 66 of the mounting bracket 36, and the taper of the generally cylindrical wall 68 causes an end portion 72 of the arrester housing 32 to be squeezed between the generally cylindrical wall 68 and the flange 70 of the second end cap 22. As a result of this squeezing action, the end portion 72 acts as a gasket or seal at the second terminal end 14 in order to isolate the interior of the arrester housing 32 from the external environment. When the arrester housing 32 is fully pressed into the opening 62 of the mounting bracket 36 so that the circumferential groove 60 is accessible, a snap ring 73 is snapped into the circumferential groove 60 in the wall 44 of the second end cap 22 to thereby clamp the surge arrester 10 to the mounting bracket 36 with enough force to maintain the seal by the end portion 72 between the generally cylindrical wall 68 and the flange 70 of the second end cap 22.

A subassembly 74 is formed by inserting the second connector 18, with the cartridge 48 inserted in the end 50, through the plastic cup 59 until the plastic cup 59 abuts a flange 76 at the end 50 of the second connector 18, and by inserting the first electrically conductive washer 52 into the plastic cup 59 until the first electrically conductive washer 52 abuts the flange 76 at the end 50 of the second connector 18. The resister 56 is inserted into the plastic cup 59 until the resister 56 abuts the first electrically conductive washer 52, and the second electrically conductive washer 54 is placed on top of the resister 56. The subassembly 74 is then inserted into the recess 46 of the second end cap 22 until the second electrically conductive washer 54 abuts the internal wall 58, leaving a space 78 as shown in FIG. 1. The space 78 is filled with an epoxy potting material in order to hold the subassembly 74 in electrical contact with the second end cap 22.

Accordingly, the recess 46 in the second end cap 22 forms a disconnector housing for the fault disconnector 47 so as to eliminate the need for a separate housing for the fault disconnector 47.

Figure 3:
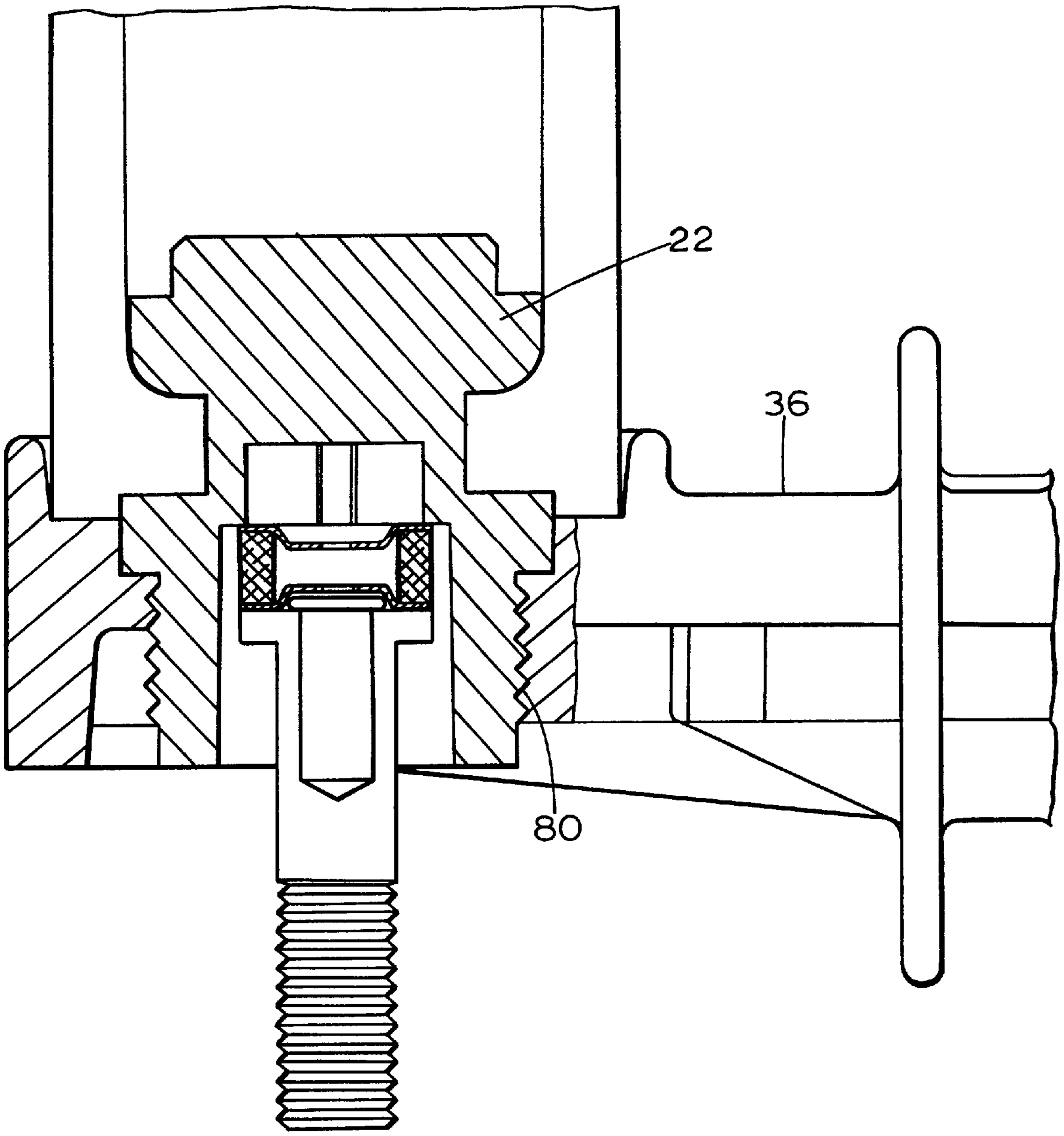
FIG. 3 is an enlarged view of a second embodiment of a surge arrester according to the present invention.

Instead of using the snap ring 73 in the circumferential groove 60 of the second end cap 22 to clamp the first and second end caps 20 and 22, the surge arresting elements 24, 26, 28, and 30, and the arrester housing 32 to the mounting bracket 36, the second end cap 22 may be threaded into the mounting bracket 36. To this end, the second end cap 22 may be externally threaded at a region 80 as shown in FIG. 3.

Figure 4:
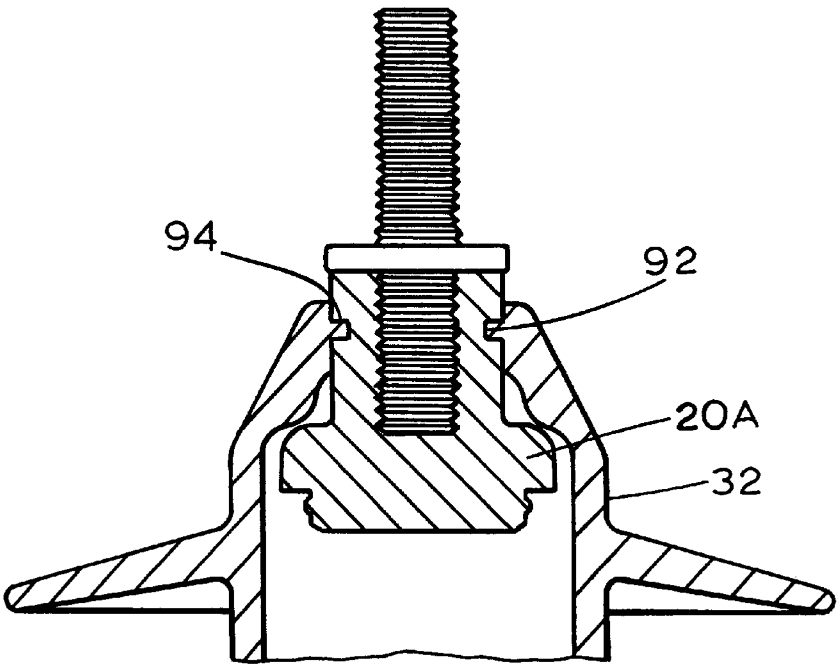
FIG. 4 illustrates a third embodiment of a surge arrester according to the present invention; and, FIG. 5 illustrates a fourth embodiment of a surge arrester according to the present invention.

As shown in FIG. 1, the arrester housing 32 is formed over the first end cap 20 so as to provide a seal in cooperation with a flange 90 of the first connector 16. This seal at the first terminal end 12 isolates the interior of the arrester housing 32 from the external environment. Alternatively, the arrester housing 32 may be configured with an integral O-ring 92 as shown in FIG. 4. The integral O-ring 92 fits within an annular groove 94 about a first end cap 20A in order to provide a seal at the first terminal end 12 that isolates the interior of the arrester housing 32 from the external environment.

Figure 5:
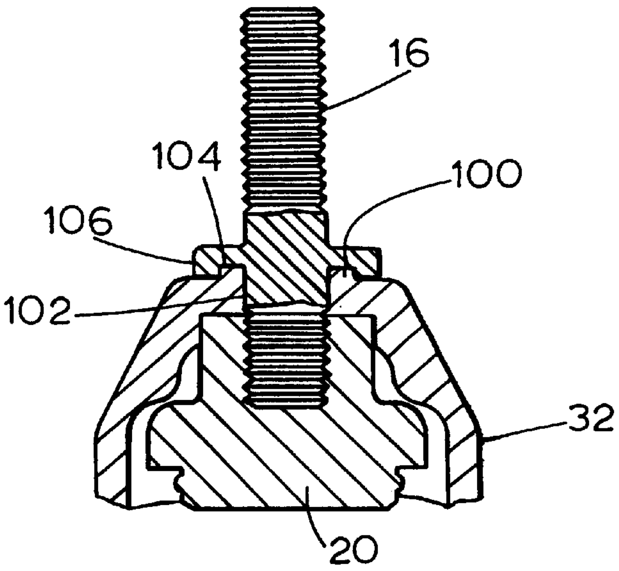

Instead of configuring an integral O-ring according to the integral O-ring 92 shown in FIG. 4, an integral O-ring 100 may be provided as shown in FIG. 5. The integral O-ring 100 is integrally formed in the arrester housing 32 at its top and defines an opening 102 through which the first connector 16 extends so that it may be threaded into the first end cap 20. The integral O-ring 100 fits within an annular recess 104 formed in a flange 106 of the first connector 16. As the first connector 16 is threaded into the first end cap 20, the integral O-ring 100 is tightly squeezed into the annular recess 104 and cooperates with the flange 106 in order to provide a seal at the first terminal end 12 that isolates the interior of the arrester housing 32 from the external environment.

Certain modifications of the present invention have been discussed above. Other modifications will occur to those practicing in the art of the present invention. For example, the first connector 16 and the first end cap 20 are shown as being separate elements. Instead, the first connector 16 and the first end cap 20 may be formed as a single, integrated, electrically conductive element.

Also, four surge arresting elements 24, 26, 28, and 30 are shown in FIG. 1 as being electrically connected between the first and second end caps 20 and 22. However, any number of surge arresting elements may be provided between the first and second end caps 20 and 22 depending upon the voltage carried by the electric power distribution system and/or depending upon the particular construction of the surge arresting elements.

Moreover, as described above, the surge arrester 10 is assembled in the following order. First, the surge arresting elements 24, 26, 28, and 30 are stacked between the first and second end caps 20 and 22, the stack formed by the surge arresting elements 24, 26, 28, and 30 and the first and second end caps 20 and 22 is wrapped with a fiber glass weave, and the arrester housing 32 is applied to the wrapped stack of the surge arresting elements 24, 26, 28, and 30 and the first and second end caps 20 and 22. Second, this arrangement is then secured to the mounting bracket 36. Third, the subassembly 74 is applied to the second end cap 22. Instead, the surge arrester 10 may be assembled in any desired order. For example, the surge arresting elements 24, 26, 28, and 30 may be first stacked between the first and second end caps 20 and 22, the stack formed by the surge arresting elements 24, 26, 28, and 30 and the first and second end caps 20 and 22 may be wrapped with a fiber glass weave, and the arrester housing 32 may be applied to the stacked surge arresting elements 24, 26, 28, and 30 and first and second end caps 20 and 22. Second, the subassembly 74 may be applied to the second end cap 22. Third, the resulting arrangement may be then secured to the mounting bracket 36.

Additionally, the first and second end caps 20 and 22 may be referred to as surge arresting elements insofar as they facilitate the surge arresting function described above.

Furthermore, the plastic cup 59 may be formed of any type of electrical insulating material other than plastic.

Also, an electrically conductive spring, such as a spring washer, may be inserted between the second electrically conductive washer 54 and the internal wall 58.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A surge arrester comprising:

a surge arresting element, wherein the surge arresting element is arranged to conduct in the presence of a surge;

a first end cap arranged to electrically connect the surge arresting element to a first electrical line;

a second end cap electrically connected to the surge arresting element, wherein the second end cap has first and second ends, wherein the first end is in direct physical and electrical engagement with the surge arresting element, wherein the second end of the second end cap is recessed to form a disconnector housing, and wherein the second end cap is substantially conductive throughout; and, a fault disconnector arranged to electrically connect the second end cap to a second electrical line, wherein the fault disconnector is arranged to disconnect the surge arresting element from the second electrical line in the event of a fault, and wherein the fault disconnector is housed within the disconnector housing formed by the second end cap.

2. The surge arrester of claim 1 wherein the first electrical line is a power line, and wherein the second electrical line is substantially at ground.

3. The surge arrester of claim 1 wherein the first and second end caps are in electrical contact with the surge arresting element.

4. The surge arrester of claim 1 wherein the surge arresting element is a metal oxide varistor.

5. The surge arrester of claim 1 further comprising a mounting bracket arranged to support the surge arresting element, the first and second end caps, and the fault disconnector.

6. The surge arrester of claim 5 further comprising a fastener arranged to fasten the surge arresting element, the first and second end caps, and the fault disconnector to the mounting bracket so that the mounting bracket is clamped between the second end cap and the fastener.

7. The surge arrester of claim 6 wherein the second end cap has first and second ends, wherein the first end is in electrical engagement with the surge arresting element, and wherein the second end of the second end cap is recessed to form the disconnector housing.

8. The surge arrester of claim 1 wherein the surge arresting element comprises a plurality of surge arresting elements.

9. An apparatus for arresting a surge on a power line comprising:

a surge arresting element, wherein the surge arresting element is arranged to conduct in the presence of the surge on the power line;

a first end cap, wherein the first end cap is arranged to electrically connect the surge arresting element to a first electrical line;

a second end cap, wherein the second end cap has first and second ends, wherein the first end of the second end cap is in direct physical and electrical engagement with the surge arresting element, and wherein the second end of the second end cap is recessed to form a disconnector housing;

an arrester housing arranged to house the surge arresting element and the first and second end caps; and, a fault disconnector, wherein the fault disconnector is arranged to connect the second end cap to a second electrical line, wherein the fault disconnector is arranged to disconnect the surge arresting element from the second electrical line in the event of a fault, and wherein the fault disconnector is housed within the disconnector housing formed by the second end cap.

10. The apparatus of claim 9 wherein the second electrical line is substantially at ground.

11. The apparatus of claim 9 wherein the first and second end caps are in electrical contact with the surge arresting element.

12. The apparatus of claim 9 wherein the surge arresting element is a metal oxide varistor.

13. The apparatus of claim 9 wherein the second end cap has first and second ends, wherein the first end is in electrical engagement with the surge arresting element, and wherein the second end of the second end cap is recessed to form the disconnector housing.

14. The apparatus of claim 9 wherein the arrester housing has a protrusion in the form of an O-ring, and wherein the protrusion is arranged to form a seal with respect to the first end cap.

15. The apparatus of claim 9 wherein the first end cap has first and second ends, wherein the second end is in electrical engagement with the surge arresting element, and wherein the arrester housing forms a seal over the first end of the first end cap.

16. The apparatus of claim 9 further comprising a mounting bracket arranged to support the surge arresting element, the first and second end caps, the arrester housing, and the fault disconnector.

17. The apparatus of claim 16 wherein the arrester housing is arranged to form a seal with respect to the mounting bracket and the second end cap.

18. The apparatus of claim 16 further comprising a fastener arranged to fasten the surge arresting element, the first and second end caps, the arrester housing, and the fault disconnector to the mounting bracket so that mounting bracket is clamped between the second end cap and the fastener.

19. The apparatus of claim 18 wherein the arrester housing is arranged to be wedged between the mounting bracket and the second end cap when the mounting bracket is clamped between the second end cap and the fastener so as to form a seal.

20. The apparatus of claim 18 wherein the mounting bracket has first and second recesses, wherein the first recess is formed by a wall of the mounting bracket, wherein the wall is tapered, wherein the second recess is arranged to receive a flange of the second end cap, and wherein the arrester housing is arranged to be wedged between the tapered wall of the mounting bracket and the flange of the second end cap when the mounting bracket is clamped between the second end cap and the fastener so as to form a seal.

21. The apparatus of claim 9 wherein the surge arresting element comprises a plurality of surge arresting elements.

22. A surge arrester comprising:

arrester elements, the arrester elements being arranged to conduct in the event of a surge;

an arrester housing that houses the arrester elements;

a mounting bracket that supports the arrester elements and the arrester housing; and, a fastener that clamps the arrester elements and the arrester housing to the mounting bracket so that the arrester housing is wedged between the mounting bracket and the arrester elements in order to form a seal for the arrester elements.

23. The surge arrester of claim 22 wherein the arrester elements comprise an end cap, wherein the end cap has first and second ends, wherein the first end is in electrical engagement with another of the arrester elements, and wherein the second end of the end cap is recessed to form a disconnector housing.

24. The surge arrester of claim 23 further comprising a fault disconnector, wherein the fault disconnector is arranged to be in electrical series with the arrester elements, wherein the fault disconnector is arranged to disconnect the arrester elements from an electrical line in the event of a fault, and wherein the fault disconnector is housed within the disconnector housing formed by the end cap.

25. The surge arrester of claim 22 wherein the mounting bracket has first and second recesses, wherein the first recess is formed by a wall of the mounting bracket, wherein the second recess is arranged to receive a flange of one of the arrester elements, and wherein the arrester housing is arranged to be wedged between the wall of the mounting bracket and the flange of the one arrester element when the arrester elements and the arrester housing are clamped to the mounting bracket.

26. The surge arrester of claim 25 wherein the wall is tapered, and wherein the arrester housing is arranged to be wedged between the tapered wall of the mounting bracket and the flange of the one arrester element when the arrester elements and the arrester housing are clamped to the mounting bracket.

27. The surge arrester of claim 25 wherein the arrester elements comprise an end cap, wherein the end cap has first and second ends and the flange, wherein the first end is in electrical engagement with another of the arrester elements, and wherein the second end of the end cap is recessed to form a disconnector housing.

28. The surge arrester of claim 27 further comprising a fault disconnector, wherein the fault disconnector is arranged to be in electrical series with the arrester elements, wherein the fault disconnector is arranged to disconnect the arrester elements from an electrical line in the event of a fault, and wherein the fault disconnector is housed within the disconnector housing formed by the end cap.

29. The surge arrester of claim 22 wherein the arrester elements comprise an arrester block and first and second end caps.

30. The surge arrester of claim 29 wherein the arrester block comprises more than one arrester block.

31. The surge arrester of claim 22 wherein the mounting bracket has a recess, wherein the recess is formed by a wall of the mounting bracket, and wherein the arrester housing is arranged to be wedged between the wall of the mounting bracket and one of the arrester elements.

32. The surge arrester of claim 31 wherein the one of the arrester elements is an end cap.

33. The surge arrester of claim 32 wherein the end cap houses a fault disconnector.

34. A surge arrester comprising:

arrester elements, the arrester elements being arranged to conduct in the event of a surge;

an arrester housing that houses the arrester elements;

a mounting bracket that supports the arrester elements and the arrester housing; and, a threadless fastener, wherein the threadless fastener is arranged to attach the arrester elements and the arrester housing to the mounting bracket so that the arrester elements and the arrester housing are supported by the mounting bracket, and wherein the threadless fastener is a snap ring.

35. The surge arrester of claim 34 wherein the conductive end cap is a first conductive end cap, and wherein the arrester elements comprise an arrester block and a second conductive end cap.

36. The surge arrester of claim 35 wherein the arrester block comprises more than one arrester block.

37. The surge arrester of claim 35 wherein the arrester block has first and second ends, wherein the first conductive end cap is electrically coupled to the first end of the arrester block, wherein the second conductive end cap is electrically coupled to the second end of the arrester block, and wherein the threadless fastener engages the second conductive end cap in order to attach the arrester elements and the arrester housing to the mounting bracket.

38. The surge arrester of claim 37 wherein the second conductive end cap has a first end electrically coupled to the arrester block and a second end protruding through the mounting bracket, and wherein the threadless fastener engages the second end of the second conductive end cap.

39. The surge arrester of claim 38 wherein the second end of the second conductive end cap has a groove, and wherein the threadless fastener engages the groove in the second end of the second conductive end cap.

40. The surge arrester of claim 39 wherein the threadless fastener is a snap ring.

41. The surge arrester of claim 37 wherein the arrester block comprises first and second arrester blocks, wherein each of the first and second arrester blocks has first and second ends, wherein the first conductive end cap is electrically coupled to the first end of the arrester block, and wherein the second conductive end cap is electrically coupled to the second end of the second arrester block.

42. A surge arrester comprising:

arrester elements, the arrester elements being arranged to conduct in the event of a surge;

an arrester housing that houses the arrester elements;

a mounting bracket that supports the arrester elements and the arrester housing; and, a threadless fastener, wherein the threadless fastener is arranged to attach the arrester elements and the arrester housing to the mounting bracket so that the arrester elements and the arrester housing are supported by the mounting bracket;

wherein the mounting bracket has a recess, wherein the recess is formed by a wall of the mounting bracket, and wherein the arrester housing is arranged to be wedged between the wall of the mounting bracket and one of the arrester elements when the threadless fastener attaches the arrester elements and the arrester housing to the mounting bracket.

43. The surge arrester of claim 42 wherein the one of the arrester elements is an end cap, wherein the end cap has a first end electrically coupled to another of the arrester elements and a second end protruding through the mounting bracket, and wherein the threadless fastener engages the second end of the end cap in order to attach the arrester elements and the arrester housing to the mounting bracket.

44. The surge arrester of claim 43 wherein the second end of the end cap has a groove, wherein the threadless fastener is a snap ring, and wherein the snap ring engages the groove in the second end of the end cap.

45. A surge arrester comprising:

arrester elements, the arrester elements being arranged to conduct in the event of a surge;

an arrester housing that houses the arrester elements;

a mounting bracket that supports the arrester elements and the arrester housing; and, a threadless fastener, wherein the threadless fastener is arranged to attach the arrester elements and the arrester housing to the mounting bracket so that the arrester elements and the arrester housing are supported by the mounting bracket;

wherein the mounting bracket has first and second recesses, wherein the first recess is formed by a wall of the mounting bracket, wherein the second recess is arranged to receive a flange of one of the arrester elements, and wherein the arrester housing is arranged to be wedged between the wall of the mounting bracket and the flange of the one arrester element when the arrester elements and the arrester housing are attached to the mounting bracket.

46. A surge arrester comprising:

arrester elements, the arrester elements being arranged to conduct in the event of a surge;

an arrester housing that houses the arrester elements, the arrester housing having an O-ring formed as a protrusion of the arrester housing; and, an electrically conductive connector cooperating with the O-ring to form a seal between an interior of the arrester housing and an exterior of the arrester housing, wherein the electrically conductive connector is arranged to be electrically coupled to one of the arrester elements.

47. The surge arrester of claim 46 wherein the electrically conductive connector has a flange forming a recess, and wherein the recess receives the O-ring.

48. The surge arrester of claim 46 wherein the arrester housing has an opening through which the electrically conductive connector extends, wherein the opening has first and second ends and is circumscribed by a wall extending between the first and second ends and defining the opening, wherein the O-ring is integrally formed around the wall, and wherein the electrically conductive connector has an annular groove that receives the O-ring to form the seal.

49. The surge arrester of claim 46 further comprising a mounting bracket that supports the arrester elements and the arrester housing.

50. The surge arrester of claim 49 further comprising a fastener that clamps the arrester elements and the arrester housing to the mounting bracket so that the arrester housing is wedged between the mounting bracket and one of the arrester elements in order to form a seal for the arrester elements.

51. The surge arrester of claim 50 wherein the electrically conductive connector has a flange forming a recess, and wherein the recess receives the O-ring.

52. The surge arrester of claim 49 wherein the mounting bracket has a recess, wherein the recess is formed by a wall of the mounting bracket, and wherein the arrester housing is arranged to be wedged between the wall of the mounting bracket and one of the arrester elements.

53. The surge arrester of claim 52 wherein the electrically conductive connector has a flange forming a recess, and wherein the recess receives the O-ring.

54. The surge arrester of claim 49 wherein the mounting bracket has first and second recesses, wherein the first recess is formed by a wall of the mounting bracket, wherein the second recess is arranged to receive a flange of one of the arrester elements, and wherein the arrester housing is arranged to be wedged between the wall of the mounting bracket and the flange of the one arrester element when the arrester elements and the arrester housing are clamped to the mounting bracket.

55. The surge arrester of claim 54 wherein the wall is tapered, and wherein the arrester housing is arranged to be wedged between the tapered wall of the mounting bracket and the flange of the one arrester element when the arrester elements and the arrester housing are clamped to the mounting bracket.

56. A surge arrester comprising:

arrester elements, wherein the arrester elements are arranged to conduct in the event of a surge, wherein the arrester elements include a conductive end cap, and wherein the conductive end cap has a first end electrically coupled to another of the arrester elements;

an arrester housing that houses the arrester elements;

a mounting bracket that supports the arrester elements and the arrester housing, wherein a second end of the conductive end cap protrudes through the mounting bracket; and, a threadless fastener, wherein the threadless fastener engages the second end of the conductive end cap in order to attach the arrester elements and the arrester housing to the mounting bracket so that the arrester elements and the arrester housing are supported by the mounting bracket.

57. The surge arrester of claim 56 wherein the second end of the conductive end cap has a groove, and wherein the threadless fastener engages the groove in the second end of the conductive end cap.

58. The surge arrester of claim 57 wherein the threadless fastener is a snap ring.

* * * * *